Jan. 12, 1943. H. A. WADMAN ET AL 2,308,473
REFRACTORY FOR CONTACT WITH MOLTEN GLASS AND
PROCESS FOR MAKING THE SAME
Filed Sept. 7, 1939
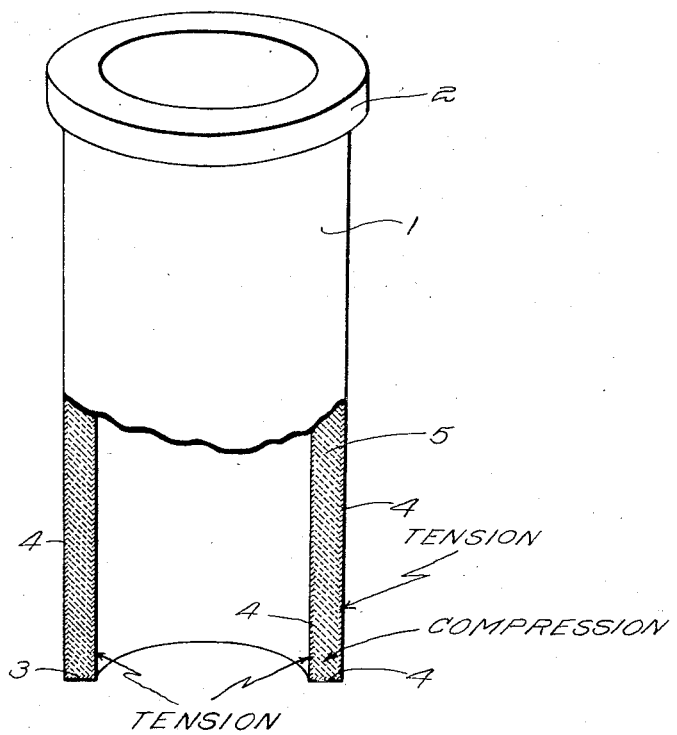
Inventors
Harold A. Wadman
Reinhold A. Schaefer
By Brown & Parham
Attorneys
Witness
W. B. Thayer

UNITED STATES PATENT OFFICE 2,308,473

REFRACTORY FOR CONTACT WITH MOLTEN GLASS AND PROCESS FOR MAKING THE SAME

Harold A. Wadman, West Hartford, and Reinhold A. Schaefer, Rocky Hill, Conn., assignors to Hartford-Empire Company, Hartford, Conn., a corporation of Delaware Application September 7, 1939, Serial No. 293,754

15 Claims. (Cl. 25—156)

This invention relates to refractories for contact with molten glass and has particular relation to glass contact refractories, such as tubes and plungers of glass feeders which are installed in the high temperature conditions of furnace or forehearth, and are quickly brought into contact with molten glass when installed.

Such refractories are subjected to severe conditions in use. The high temperature to which these refractories are subjected and the corrosion and erosion thereof by the molten glass cause rapid wear requiring frequent replacement of parts. This interferes with production of glassware and increases costs.

Many glass contact refractories have to conform to certain dimensions or shapes for proper operation, and rapid wearing away of such parts requires even more frequent replacement than is necessary with other parts. The requirements for high resistance to corrosion and erosion and minimum contamination of the molten glass by impurities in the refractories, limits the selection of materials from which these refractories can be made. Also, the cost of the materials used must be sufficiently low for economical production, and the materials must have certain properties for shaping, handling and firing.

Although glass contact refractories have been improved in recent years in their resistance to high temperature, corrosion and erosion, further improvement is highly desirable in order to reduce the costs of and to facilitate the production of glassware.

Another very desirable improvement in these refractories is in resistance to heat shock. This becomes apparent when it is noted that when these refractories are installed or replaced because badly worn or because parts of different sizes are required, they must undergo a drastic change in temperature, namely, from room or factory temperature of about 80° F. to the temperature of the forehearth or furnace which may range from 1800° F. to 2300° F. or higher. This subjects the refractories to severe heat shock which shatters or cracks refractories heretofore produced, if proper precautions are not taken. This heat shock is accentuated by contact with molten glass, because of its high heat mass and its intimate contact with the parts, in some cases the glass completely surrounding the parts, and in some cases contacting both inside and outside walls of the parts.

Glass contact refractories heretofore available have been notably lacking in resistance to heat shock, because of the types of materials or compositions and the methods of manufacture which have been employed in producing the refractories. Therefore, it has been necessary to take special precautions in installing the refractories previously used by first preheating them. Usually a warming furnace is employed for this purpose, in which the refractories are carefully and gradually preheated to about 1400° F. But even with preheating, previously available refractories often crack or break from heat shock upon installation, and the maintenance of a warming furnace increases costs and is an inconvenience.

Although preheating may be avoided by making the refractories from fused silica, this material as heretofore used lowers resistance to corrosion, at least of soda-lime-silica glass which is used more than any other composition. Also, preheating in a warming furnace has been avoided with floaters or rings used in gathering glass, which are of such structure that they can be soaked in water which protects them from heat shock by the formation of a cool blanket of insulating glass around them as they are immersed in the molten glass. But this procedure is rare, is also inconvenient and is not applicable to other glass contact refractories, particularly parts for glass feeders.

The general object of this invention is to provide novel glass contact refractories, such as tubes and plungers for glass feeders having unusually good resistance to corrosion and erosion by molten glass and also having exceptional resistance to heat shock.

We have discovered from extensive research and tests that certain materials or compositions can be combined in certain ways to provide glass contact refractories having not only unusually good resistance to corrosion, but also having such a high degree of resistance to heat shock as to permit our novel refractories, when taken at factory temperature, to be directly and quickly installed in a forehearth or furnace at high or operating temperature and immersed in the molten glass therein without shattering or cracking. Such resistance to heat shock is referred to herein as "perfect resistance to heat shock." Thus, preparation for installation as by preheating and the attendant cost and loss from breakage and interruptions or delay in glass making operations are largely reduced or eliminated. So far as we are aware, refractories of the above character have never been produced heretofore, those previously produced having either inferior resistance to corrosion, or inferior or no resistance to heat shock, or both of these defects.

A most surprising and unexpected part of our discovery or invention is that composite refractories may be produced having perfect resistance to heat shock by employing compositions for either the surface layer or both surface layer and interior which compositions, when used alone, have little or no resistance to heat shock. This is of especial importance because it permits the use of compositions having high resistance to corrosion or other advantages, but which can not be used by themselves because they have poor or no resistance to heat shock when so used. Consequently, the invention permits more freedom in the selection of materials from which glass contact refractories may be produced.

The foregoing novel results are obtained by making a composite refractory comprising an outer layer or surface layer of high corrosion resistance preferably integral with an inner layer or interior, the outer layer or surface having a higher coefficient of expansion than the inner layer or interior, and therefore being under tension, the interior probably being under compression. It is understood that the conditions of tension and compression here referred to obtain when the article is at room or factory temperature.

The exceptional or perfect resistance to heat shock of refractories embodying this invention or discovery may be due to the expansion of the outer layer or surface which, because of its being under tension when the heat shock is applied, can expand without buckling or cracking and without causing or starting a crack or strain in the inner layer or interior which would result in cracking or breaking of the refractory part. However, the invention is not to be limited to the foregoing explanations of the resistance of these novel refractories to heat shock except as may be expressly recited in the claims.

The tension in the outer or surface layer may be obtained by the use of a wide variety of compositions for the outer layer and interior respectively, and the amount of tension may be widely varied by the use of different compositions for the respective outer and interior portions in various combinations. Although the outer layer or surface should have high resistance to corrosion, the interior may or may not have high corrosion resistance, although high corrosion resistance in the interior may be desirable to prolong the life of the refractory in the event that the molten glass wears through the outer layer or surface.

The amount of tension in the outer layer or surface may be so great as to cause crazing of the outer layer in firing and cooling in the kiln, but the outer layer is so well bonded to the interior as to be integral therewith and consequently spalling or flaking off of the outer layer does not occur in firing or in use even though crazing may be rather severe. This probably is due to the interfacial penetration of the material of the outer surface and interior, respectively, which occurs when the refractories are produced by the preferred method described below and by an intergrowth or union which results in firing. Crazing apparently does not lessen the resistance to heat shock but does tend to lessen resistance to corrosion, because the molten glass may penetrate the cracks in the outer layer and corrode the interior. However, crazing may be reduced and even eliminated by so altering the batches as to decrease the difference in coefficients of expansion of the outer layer or surface and interior.

By way of example and not in limitation of the invention, we will describe a refractory part embodying the invention, the manner in which it may be formed, and various compositions or batches for producing the part or other refractories for contact with molten glass. It will be understood that various shapes or parts may be produced and variations may be made in batch compositions and method of manufacture without departing from the invention as defined by the claims.

In the single figure of the accompanying drawing, I have shown in perspective and partly in vertical section, a tube of the type used in glass feeders. This tube consists of the cylindrical body 1, having an annular flange 2 at the top thereof by means of which the tube is clamped in a suitable supporting or revolving mechanism (not shown) over the orifice of a feeder (also not shown). Such a tube is used for stirring the glass in which it is immersed and as a gate for regulating the flow of glass into the feeder orifice. The bottom end 3 of the tube should be accurately formed and its square shape must be maintained fairly accurately in service.

The tube is composed of the outer layer or surface 4 which is under tension, and the inner layer or interior 5 which probably is under compression as the result of tension in the outer layer or surface. The outer layer or surface 4 is preferably integral with the interior 5 being bonded thereto as the result of the manner in which the article is produced.

The tube or other articles may be formed in various ways and fired to produce the finished articles. Thus the interior may first be shaped by stiff mud molding, slip casting or in other known manner and the outer layer applied thereto by dipping, spraying or otherwise. However, I prefer to form the composite refractories of the invention by first casting a slip of the selected composition for the outer layer in a plaster of Paris mold, allowing this to set until a layer of the desired thickness is formed in the mold, and then draining the remaining slip from the interior of the shell thus formed. This shell, preferably while still moist, is then filled with slip of the composition selected for the inner layer or interior which is allowed to set, shrinkage being compensated by the supply of additional slip. When the composite article thus cast is sufficiently stiff, it is removed from the mold and the opening through which the draining was accomplished is smoothed over and may, if desired, be covered with material preferably of the composition of the outer layer.

The above procedure results in the formation of an outer layer of uniform thickness and the thickness can be controlled between wide limits. Furthermore, the method of casting employed appears to promote or to cause the formation of an exceptionally good bond between the outer layer and interior when the article is formed, and results in an integral composite body. The bond is so good that the outer layer does not separate and cannot be separated from the inner layer or interior. Experience indicates that the best bond between the layers is obtained when the interior material is cast immediately after the surface layer has set and the surplus slip is removed.

In the following table we have given examples of slip casting batches or compositions in parts by weight for the outer layer or surface, and for the inner layer or interior, respectively, in various combinations for the production of composite refractories or bodies embodying the invention. Each body is numbered and the batch for the outer or surface layer is in line with the word "Surface," and that for the associated inner layer or interior is below the "surface" batch in line with the word "Interior."

mineral is low in alkali metal oxides ($K_2O$ and $Na_2O$), alkaline earth metal oxides (CaO, MgO) and iron oxide, and has good chemical resistance to the attack of molten glass.

The fused silica is commercial fused silica which is employed because of its purity and its low coefficient of expansion. Increasing amounts of fused silica decrease the coefficient of expansion of the fired batches in which it is used.

| Number of body | Tabular corundum 30 mesh | Tabular corundum 100 mesh | Raw kyanite 30 mesh | Raw kyanite 100 mesh | Fused silica 8 mesh | Fused silica 30 mesh | E. K. K. grog 8 mesh | E. K. K. grog 30 mesh | E. K. K. grog 100 mesh | Georgia white kaolin | K. T. ivory ball clay | Total |
|---|---|---|---|---|---|---|---|---|---|---|---|---|
| 1. Surface | 80 | | | | | | | | | 10 | 10 | 100 |
| Interior | | | | | | | 35 | 40 | | 12.5 | 12.5 | 100 |
| 2. Surface | 80 | | | | | | | | | 10 | 10 | 100 |
| Interior | | | | | 40 | | | | 40 | 10 | 10 | 100 |
| 3. Surface | | | 75 | | | | | | | 12.5 | 12.5 | 100 |
| Interior | | | | | 40 | | | | 40 | 10 | 10 | 100 |
| 4. Surface | 60 | | 20 | | | | | | | 10 | 10 | 100 |
| Interior | | | | | 40 | | | | 40 | 10 | 10 | 100 |
| 5. Surface | 70 | | | | | 10 | | | | 10 | 10 | 100 |
| Interior | | | 40 | | 20 | | | 20 | | 10 | 10 | 100 |
| 6. Surface | 80 | | | | | | | | | 15 | 15 | 100 |
| Interior | | | 40 | | 20 | | 10 | | | 10 | 10 | 100 |
| 7. Surface | 40 | | 40 | | | | | | | 10 | 10 | 100 |
| Interior | | | 40 | | 20 | | | 20 | | 10 | 10 | 100 |
| 8. Surface | | 40 | | 40 | | | | | | 10 | 10 | 100 |
| Interior | | | 40 | | 20 | | | 20 | | 10 | 10 | 100 |
| 9. Surface | 70 | | 10 | | | | | | | 10 | 10 | 100 |
| Interior | | | 40 | | 20 | | | 10 | | 15 | 15 | 100 |
| 10. Surface | 60 | | 20 | | | | | | | 10 | 10 | 100 |
| Interior | | | 20 | | 20 | | | 40 | | 10 | 10 | 100 |
| 11. Surface | 50 | | 30 | | | | | | | 10 | 10 | 100 |
| Interior | | | 40 | | 20 | | | 20 | | 10 | 10 | 100 |
| 12. Surface | 80 | | | | | | | | | 10 | 10 | 100 |
| Interior | | | 30 | | 20 | | | 20 | | 15 | 15 | 100 |
| 13. Surface | 80 | | | | | | | | | 10 | 10 | 100 |
| Interior | | | 20 | | 20 | | | 30 | | 15 | 15 | 100 |
| 14. Surface | | | 75 | | | | | | | 12.5 | 12.5 | 100 |
| Interior | | | 40 | | 20 | | | 10 | | 15 | 15 | 100 |
| 15. Surface | 80 | | | | | | | | | 10 | 10 | 100 |
| Interior | | | 30 | | 15 | | | 25 | | 15 | 15 | 100 |
| 16. Surface | 90 | | | | | | | | | 10 | 10 | 100 |
| Interior | | | 30 | | 10 | | | 30 | | 15 | 15 | 100 |
| 17. Surface | 80 | | | | | | | | | 10 | 10 | 100 |
| Interior | | | | | | | 35 | 35 | | 15 | 15 | 100 |

Where the mesh size of an ingredient is given, such as 8 mesh, 30 mesh or 100 mesh, substantially all or all of the ingredient passes a standard mesh screen of the number specified, together with fines of various sizes which make up a large proportion of the material or ingredient employed.

The following table sets forth the approximate composition of some of the constituents of the batches in the table of batch compositions:

| | Tabular corundum | Raw kyanite | Georgia kaolin | K. T. ivory ball clay |
|---|---|---|---|---|
| $SiO_2$ | .69 | 38.91 | 44.74 | 56.44 |
| $Al_2O_3$ | 99.53 | 57.69 | 39.60 | .67 |
| $Fe_2O_3$ | .15 | .42 | .30 | 26.66 |
| $TiO_2$ | | .62 | 1.56 | 2.22 |
| CaO | .10 | .12 | Trace | .12 |
| MgO | .06 | .44 | .01 | .31 |
| $K_2O$ and $Na_2O$ | .06 | .84 | .26 | .81 |
| $H_2O$ | | | .58 | 1.49 (110° C.) |
| Ignition loss | .01 | 1.05 | 13.61 | 11.28 |
| Totals | 100.60 | 100.09 | 100.66 | 100.28 |

The tabular corundum is a relatively pure form of aluminum oxide obtained from the Aluminum Company of America. This material is used because of its high fusion point, its purity and high resistance to corrosion and its relatively high coefficient of expansion. It is prepared by crushing and grinding to the desired size.

The raw kyanite is an aluminum silicate of the sillimanite group of minerals which tends to expand on firing, and may be employed to increase resistance to heat shock. The mineral is crushed in a jaw crusher, metallic iron removed and ground in a ball mill and then screened. This The use of fused silica for the interiors of the composite bodies of this invention does not lower resistance of the bodies to corrosion, because the glass does not come into contact with it.

The Georgia white kaolin is Edgar's Klondike kaolin, which is an exceptionally pure (low in alkali and alkaline earth oxides and iron oxide) non-plastic kaolin having a high softening point, having a low free silica content and is used for these properties and because, when used with the K. T. ivory ball clay, it improves the casting properties and green and fired strength of the bodies. This kaolin is used for making the E. K. K. grog by firing it to about 2800° F. in the form of dobies to provide hard dense material which is crushed, screened and passed through a magnetic separator for removal of iron. The use of this grog reduces drying and firing shrinkage and assists control of shape and dimensions of the articles.

The K. T. ivory ball clay is obtained from the Tennessee Clay Company and is used for its high plasticity and good slip casting qualities, low free silica content and high purity. This clay works especially well with the Georgia white kaolin. It is convenient to use this clay in air floated form so that it may be introduced into the blunger without soaking. Other kaolins and clays, or clay mixtures having properties similar to those of the Georgia kaolin and K. T. ivory ball clay, may be employed.

The batches are prepared by the usual methods of mixing and blunging. Preferably ammonia is used as a deflocculent because it volatilizes and leaves no fluxes in the batches which would decrease their resistance to corrosion, as is the case with such deflocculents as sodium carbonate and sodium silicate and because the amount of ammonia used is not critical. Also ammonia does not clog the pores of the molds, as is the case with other deflocculents.

The articles after drying are fired to a temperature ranging from 2400° F. to 2600° F. and upwards. Where batches are employed containing raw kyanite, the articles should be fired to 2600° F. to remove most, if not all, of the expansion from the kyanite and convert it to mullite and glassy matrix. However, composite bodies numbers 1 and 17 may be fired to as low a temperature as 2400° F.

In the batches for the interior the E. K. K. grog may be at least partly replaced by Alundum, tabular corundum, electrically fused aluminum silicate (mullite or mullite and corundum), synthetic mullite or mullite and corundum and raw minerals of the sillimanite group, such as sillimanite and andalusite, so long as substantial amounts of impurities are not introduced by their use and so long as the coefficient of expansion is less than that of the outer layer. Other changes may be made in the batches for the outer layer and the interior of the composite bodies, but the use of tabular corundum is preferred because it materially increases resistance to corrosion and also gives a relatively high coefficient of expansion in the outer layer.

The bodies, when fired, are white or light in color and the outer layer fires to a dense condition and is highly resistant to penetration of molten glass and to the corrosive action of the glass. The interior, when containing kyanite, fires to a more or less open structure due to the expansion of the kyanite. When the kyanite is omitted from the interior, as when replaced by E. K. K. grog, the interior is denser and has no irreversible expansion, as is the case, for example, with composite bodies numbers 1 and 17.

In order to test the resistance to heat shock of various bodies, the specimen is taken at room or factory temperature, that is, at about 80° F. and without preheating or other preparation, is dropped quickly into molten glass at 2400° F. by optical reading. When the specimen does not break or crack when so tested, it is said to have "perfect resistance to heat shock." Refractories of this invention also have been tested for perfect resistance to heat shock by immersing them in molten glass at temperatures ranging from 1800° F. to 2600° F., which is the actual operating temperature range of soda-lime-silica glass in making glassware by the feeder method.

Refractories have been tested for resistance to corrosion in the form of feeder tubes by rotating the specimen immersed six or eight inches in commercial soda-lime-silica bottle or container glass at 2400° F. by optical reading at the rate of 6 to 8 R. P. M. for thirty or sixty days, and observing the degree and character of wear. The molten glass is replaced with fresh glass every 15 days to restore its corrosiveness.

Bodies numbers 1, 2 and 4 to 17, inclusive, have perfect resistance to heat shock and body number 3 has good resistance to heat shock when tested in the above manner, even though the outer layers or surfaces for these bodies, when used even though the interior of composite bodies numbers 1 and 17 have poor resistance to heat shock when used alone. Although the interiors of bodies numbers 2 to 16, inclusive, have good resistance to heat shock when used alone and some of them may have perfect resistance to heat shock when so used, these compositions have poor or inferior resistance to corrosion when used alone. On the other hand, composite bodies numbers 1, 2, 4, 6, 9, 12, 13, 15, 16 and 17 have excellent resistance to corrosion, numbers 7, 8 and 11 excellent but not as good as the preceding, number 3 very good, and number 5 good resistance to corrosion.

The resistance to corrosion of bodies numbers 2, 3, 4, 6, 12, and 13 is less than that of the other bodies because numbers 2 and 3 craze in firing, number 4 crazes slightly, numbers 6 and 13 craze slightly and number 12 crazes very faintly. Bodies numbers 1, 5, 7 to 11 and 14 to 17 fire without crazing.

From the foregoing it will be apparent that the invention provides novel composite refractories having exceptional resistance to heat shock and to the corrosive action of molten glass.

Having thus described our invention, what we claim is:

1. A composite ceramic refractory article for contact with molten glass, comprising an outer surface of ceramic material on the interior ceramic material of said refractory, said materials differing in composition and said outer surface material being under tension on said interior material when said article is at room or factory temperature.

2. A composite ceramic refractory article for contact with molten glass, comprising an envelope of ceramic material under tension on the interior ceramic material of said refractory when said article is at room or factory temperature, said materials being of different compositions.

3. A composite ceramic refractory article comprising an outer ceramic layer on the interior ceramic material of said refractory of such properties respectively that said composite refractory has perfect resistance to heat shock that is, can be taken at room temperature and immersed in molten glass without shattering or cracking which would crack the material of the outer layer if separately used, said outer layer having high resistance to corrosion, said outer layer and interior material differing in composition.

4. A composite ceramic refractory for contact with molten glass comprising an outer ceramic layer integral with the interior ceramic material of said refractory, said outer layer and said interior material respectively consisting of such different compositions of the alumina-silica type of such properties that said composite refractory has perfect resistance to heat shock which would crack either composition if separately used, that is, can be taken at room temperature and immersed in molten glass without shattering or cracking.

5. A composite ceramic refractory glass working implement comprising an outer ceramic layer integral with the interior ceramic material of said implement and of such properties that said implement has perfect resistance to heat shock that is, can be taken at room temperature and immersed in molten glass without shattering or cracking even though said layer and material would crack under the same heat shock, and at least said outer layer having high resistance to corrosion, said outer layer and interior material differing in composition.

6. A composite ceramic refractory article for contact with molten glass comprising a surface ceramic layer having high resistance to corrosion integral with the interior ceramic material of said article, said surface layer having a higher coefficient of expansion than said interior material and being under tension thereon, when said article is at room or factory temperature, and said refractory having perfect resistance to heat shock, that is, capable of being taken at room or factory temperature and immersed in molten glass without shattering or cracking.

7. A composite ceramic refractory article for contact with molten glass, comprising an outer ceramic surface layer integral with the interior ceramic material of said refractory, said outer layer consisting of the fired derivatives of a batch containing approximately 80 per cent. tabular corundum and the balance raw clay, and having high resistance to corrosion, said interior material consisting of the fired derivatives of a batch containing approximately 75% clay grog and the balance raw clay said outer surface layer being in tension on said interior material, said refractory article having perfect resistance to heat shock, that is, capable of being taken at room or factory temperature and immersed in molten glass without shattering or cracking.

8. A composite ceramic refractory for contact with molten glass comprising a surface ceramic layer integral with the interior ceramic material thereof, said surface layer consisting of the fired derivatives of a batch containing approximately 80 per cent. tabular corundum and the balance clay, and having high resistance to corrosion and a higher coefficient of expansion than said interior and being under tension on said interior material when said article is at room or factory temperature.

9. The method of making a glass contacting refractory having a surface layer integral with the interior thereof and having high resistance to heat shock which comprises casting in a mold a batch having, when fired, high resistance to corrosion and a certain coefficient of expansion, and after a surface layer of desired thickness has set in said mold, draining the surplus from within the shell thus formed, casting within the shell a batch for the interior of the refractory which, when fired, has a lower coefficient of expansion than said surface layer, removing the casting from the mold, and firing the casting to set up tension in the surface layer on the interior.

10. The method of forming a refractory article for contact with molten glass which comprises forming and firing an outer layer of material, having high resistance to corrosion integrally with material for the interior of said article the respective materials being so selected that after the article is fired and cooled to room temperature, the outer layer of material will be under tension on the interior material and the article will have both high resistance to corrosion and high resistance to heat shock.

11. A refractory tube for use in molten glass in glass feeders comprising a glass resistant ceramic surface layer bonded to an interior ceramic material, the respective physical properties of which surface layer and interior are such that said tube has the property of perfect resistance to heat shock, said layer and interior being of different compositions.

12. A composite ceramic article for contact with molten glass, comprising an outer surface of ceramic material on the interior ceramic material of said refractory, both of said ceramic materials being of the alumina-silica type, said materials differing in composition and said composite refractory having higher resistance to thermal shock than either of said materials.

13. A composite refractory article for contact with molten glass, comprising an outer surface of ceramic material on the interior ceramic material of said refractory, said materials differing in composition, and said composite refractory having higher resistance to thermal shock than either of said ceramic materials.

14. A composite ceramic refractory article for contact with molten glass, comprising an outer surface of ceramic material on the interior ceramic material of said refractory, said materials differing in composition, and said outer surface material having high corrosive resistance, said composite refractory having higher resistance to thermal shock than either of said materials.

15. A composite refractory article for contact with molten glass, comprising a body of ceramic material having low thermal shock resistance and an outer layer of ceramic material having low thermal shock resistance and high corrosive resistance, the outer layer being bonded to the body material, said composite article having higher thermal shock resistance than the thermal shock resistance of either said body or said layer.

HAROLD A. WADMAN.
REINHOLD A. SCHAEFER.

CERTIFICATE OF CORRECTION.

Patent No. 2,308,473.                                    January 12, 1943.

HAROLD A. WADMAN, ET AL.

It is hereby certified that error appears in the printed specification of the above numbered patent requiring correction as follows: Page 4, first column, line 69, after "used" insert --alone, all have poor resistance to heat shock and--; and second column, line 52, claim 4, strike out "such"; and that the said Letters Patent should be read with this correction therein that the same may conform to the record of the case in the Patent Office.

Signed and sealed this 23rd day of February, A. D. 1943.

(Seal)

Henry Van Arsdale,
Acting Commissioner of Patents.